United States Patent [19]

Ryaboshtan et al.

[11] Patent Number: 4,602,215

[45] Date of Patent: Jul. 22, 1986

[54] ELECTROMAGNETIC FIELD METHOD OF DETECTING CONTEMPORARY GEODYNAMIC MOVEMENTS IN MASSIF

[75] Inventors: Jury S. Ryaboshtan; Evgeny P. Takhtamirov, both of Donetsk, U.S.S.R.

[73] Assignee: Tematicheskaya Expeditsia Proizvodstvennogo Obiedinenia "Ukrulegeologia", Iliicha, U.S.S.R.

[21] Appl. No.: 499,186

[22] Filed: May 31, 1983

[51] Int. Cl.[4] .............................................. G01V 3/08
[52] U.S. Cl. .................................................... 324/334
[58] Field of Search ........................ 324/334, 335–337, 324/323

[56] References Cited

U.S. PATENT DOCUMENTS

| 1,241,197 | 9/1917 | Conklin | 324/334 |
| 1,960,028 | 5/1934 | Ricker | 324/334 |
| 3,264,555 | 8/1966 | Barret | 324/334 |
| 3,524,129 | 8/1970 | Ikrath | 324/334 |
| 3,621,380 | 11/1971 | Barlow | 324/323 X |
| 4,393,350 | 7/1983 | Hansen et al. | 324/334 |

FOREIGN PATENT DOCUMENTS 396659  8/1973  U.S.S.R. .

OTHER PUBLICATIONS

Khmelevskoi, V. K., "Osnovnoi Kurs Electrorazvedki," ch. II, Izd. Moskov—Skogo Universiteta, 1971, p. 256.
Velikin et al, Electromagnetic Fields Used in Induction Methods of Electrical Prospecting-A Survey of Foreign Publications, Gostoptekhizdat, Leningrad, 1962, pp. 211, 212, 260.
Drake et al, Geodynamics—Where Are We and What Lies Ahead?; Science, vol. 213, No. 4503, 3 Jul. 1981, pp. 15, 16, 20.
Zoback et al, State of Stress and Intraplate Earthquakes in the United States; Science, vol. 213, No. 4503, 3 Jul. 1981, pp. 97, 104.
Howard et al, "Geology In Environmental Planning", copyright 1978, McGraw-Hill, Inc., pp. 220, 233, 234, 405–407.

Primary Examiner—Gerard R. Strecker
Attorney, Agent, or Firm—McAulay, Fields, Fisher, Goldstein & Nissen

[57] ABSTRACT

In a surface layer of a massif or in a control medium brought in contact with the massif an electromagnetic field is established, and series of amplitudes of the field magnetic component or series of other electromagnetic field parameters are periodically measured, the parameters being a function of the electromagnetic parameters of the medium being irradiated. The measurements are made in a circle of up to 5 m radius with a center in a profile point, whereafter the results of measurements made in different times are compared and the contemporary geodynamic movements are evaluated from the variation of a characteristic of an azimuth anisotropy of the electromagnetic parameter of the medium being irradiated. From the nature of the variations of the characteristic there is determined a type of rock deformation associated with the contemporary geodynamic movements, and from the speed of these variations there is determined the intensity of the contemporary geodynamic movements.

10 Claims, 13 Drawing Figures

ELECTROMAGNETIC FIELD METHOD OF DETECTING CONTEMPORARY GEODYNAMIC MOVEMENTS IN MASSIF

BACKGROUND OF THE INVENTION (a) Field of the Invention

The present invention relates to the field of geophysics, and is particularly concerned with methods for detecting the contemporary geodynamic movements or more properly the geodynamics in a massif. The invention is of particular advantage in the case of geological surveying for construction. It may be also useful in solving scientific and practical problems arising in the field of mining, seismology, and prospecting for and survey of minerals, by using the methods of structural-geodynamic mapping.

(b) Prior Art

One of the main factors capable of decreasing a geological risk in designing and building up-to-date engineering structures (especially unique ones) is an availability of structural-geodynamic maps containing information both on the tectonic structure of the area being surveyed and on the nature and the rate of the current geodynamic processes. Such information is of particular value for the regions with a higher seismic activity, in the areas susceptible to formation of cock-pits, landslip, or having active tectonic structures, and in the areas where the rock mass is intensively influenced by the presence of engineering structures.

The structural mapping is based on the data obtained by drilling. However, the drilling operations involve considerable expenses and cannot be directly used for obtaining information on the nature of the contemporary geodynamic movements.

Conventional geophysic methods of structural mapping are based on analyzing characteristics of the natural and artificially established fields. The presence and nature of disturbances occuring in such fields allow judging tectonic faults and the attitude thereof, and provides a basis for making structural maps. In principle, all geophysic fields contain information on the contemporary geodynamic movements. However, obtaining this information in a usable form is practically impossible because of the disturbances caused in the fields being examined by natural inhomogeneity of rock mass (which inhomogeneity creates complications in carrying out other works utilizing geophysic methods, such as structural mapping, prospecting for and surveying minerals). For instance, in practicing widely known methods of structural mapping based on establishing electromagnetic fields (cf. A. B. Velikin, G. S. Frantov "Electromagnityne polia, primenjaemye v indukzionnyh metodah electromagnitnoi razvedki", Leningrad, 1962 pp. 221-212 and 260) a deep sounding of rock medium is often needed, wherein the electromagnetic field reaches a fault being searched (tectonic dislocation) which is covered by overlying deposits, and the intensity of the field is sufficient enough to provide a recording disturbance caused by said tectonic fault.

In the case of such sounding the whole stratum of overlying rock above the tectonic dislocation screens the latter and the electromagnetic field being recorded is indicative of all the non-uniformities existing in said stratum, and it is not unusual when the disturbances caused by these non-uniformities are by their intensity and morphology similar to those caused in the field by the tectonic dislocation itself.

A circular sounding which is used for structural mapping, and prospecting for minerals produces essentially the same results. The circular sounding is a modification of the deep sounding, wherein the electromagnetic field set up in a massif is examined from different azimuth directions from the source of electromagnetic radiation at a distance measuring tens of meters (cf. V. J. Hmelevskoi "Osnovnoi kurs electrorazvedki", ch.II, izd. Moskovskogo universiteta, 1971, p.256).

The area to be explored having such a radius includes inhomogeneous and non-isotropic rocks having a long time of relaxation (many decades), which makes this method unsuitable for detecting the contemporary geodynamic movements. The depth to which a survey is carried out makes it probable that the medium being explored includes magnetic inclusions, which considerably complicates the measuring techniques.

Screening the tectonic dislocation by the stratum of overlying rocks similar to those described above also takes place in the case of examining natural fields of forces (gravitational, magnetic, gas and other fields) in geophysic methods of survey.

The information on the character of the contemporary geodynamic movements can be obtained by conventional instrumental survey methods such as precision repeated levelling, clinometering, deformography, extensometering, etc.). All these methods, however, are local and require complex and costly measures to eliminate the influence of such destabilizing factors as temperature, humidity, pressure, etc. on the measurement results, which lowers the promptness of these methods.

It should be noted that all the above-mentioned methods, when combined, may be used for making structural geodynamic maps, but for practical needs when detailed information is required about relatively large areas such mapping involves tremendous expenses.

The first attempt to provide an economically viable solution for the above problem was development of a method of detecting the contemporary geodynamic movements of tectonic structures utilizing an emanation survey (cf. USSR Author's Certificate No. 396,659, Int.Cl G 01V5/00).

This method utilizes an emanation ability of overlying deposits and comprises selecting, with the aid of a gas sampler and vacuum pump, samples of soil air from the wells up to 0.8 m deep drilled at the profile stations, and determining with the aid of analyzing devices the concentration and composition of the radioactive gases (radon and thoron). The changes in concentration of said gases relative to the background concentration is used to judge the contemporary geodynamic movements of the tectonic structures.

The use of the prior art emanation survey is based on the experimentally established fact of interrelation in space and time of emanation anomalies with the areas of the contemporary geodynamic movements.

The above method does not require costly and power-consuming equipment, and its advantage over the prior art methods lies in the promptness of the surveying operation, which makes it suitable for examining rapidly progressing dynamic processes and/or dynamic processes finely differentiated in space, which practically were not possible to examine.

The necessity to introduce equipment (gas sampler) into the medium being examined leads to a higher labour consumption (2 to 3 men are required to carry out such measurements and hence to a higher cost of survey operation, and also may cause a damage of pavements (on the roads and side-walks). When such surveys are carried out in towns and cities special measures must be taken to prevent the damage of service lines (cables, water and gas pipe lines, etc.). Furthermore, carying out this method involves earth work which considerably lowers the promptness of carrying out this method.

Since the above method is based on analysing the natural field, the characteristics of this field cannot be arbitrarily changed. In particular, the region of surveying medium by using radon which is capable of providing more information than the second gas (i.e. thoron) represents a lower half-space of about 10 m radius, and therefore the depth of survey cannot be adjusted to another value corresponding to a depth of the medium position. This leads to the distortion of the measurement results, caused by superposition of the emanation field variation due to inhomogeneity of the medium being surveyed.

The reliability of the data thus obtained is also lowered to a great extent by the influence that baro-hydrothermal conditions of the rocks exert on the emanation survey results, as well as by their initial condition (for instance loosening of soil as a result of agricultural work).

A substantial disadvantage of this method lies in that the physical characteristic of the medium being examined, selected for measurements, has a low information ability: the variation of this characteristic is used to form a judgement on variation of the contemporary tectonic stress fields, and on the geodynamic movements in the massif corresponding to these variations. Laboratory research carried out by Moscow geological survey institute has shown that emanation ability of soil is determined not only by the rate of the contemporary movements but also by the dynamics of these movements in time. It has been established that even insignificant but rapidly changing movement sharply increases the emanation ability of soil, and at the same time intensive but slowly changing movement may under certain conditions even decrease such ability. Therefore, the rate of variation of emanation ability of soil, determined by repeated measurements, makes it possible to determine one of the qualitative characteristics of the contemporary movements, namely, rate of their variation (dynamics) in time relative a certain terrain (since such rate of variation manifest itself most intensively over tectonic disturbances and the areas influenced thereby), but does not permit quantitative measurement of the intensity of the detected movements.

The information obtained by measuring emanation ability of soil, as described above, is of a scalar character, that is variation of the emanation ability has a scalar character, which variation is detected as a result of repeated measurements. Therefore, this method does not allow determining the character of the deformation caused by the detected geodynamic processes, thus rendering it less capable of providing more information.

In addition, the field of application of the above method is limited by that measuring the emanation of the soil gases may be effected only if the overlying soils are those like clay, loam, or black soil (chernozem).

SUMMARY OF THE INVENTION

The principle object of the invention is to provide a highly efficient method of detecting the contemporary geodynamic movements in massif.

An object of the invention is to provide a method of detecting the current geodynamic movements in a massif, which is capable of providing a greater quantity of information.

Another object of the invention is to provide a method of detecting the contemporary geodynamic movements in a massif, which is based on measuring such a physical characteristic of the medium being explored which can provide a greater quantity of information about a tectonic stress field and which is controllable by contactless proximate methods.

Still another object of the invention is to provide a method of detecting the contemporary geodynamic movements in a massif, which allows determining the character of rock deformation caused by said movements.

In particular an object of the invention consists in determining the rock deformation of a compression-tension type.

Yet another object of the invention consists in determining a rock displacement.

A further object of the invention is to determine the intensity of the contemporary geodynamic movements.

Yet a further object of the invention is to provide a possibility to carry out a structural-geodynamic mapping throughout irrespective of the type of medium constituting a surface portion of a massif.

The invention consists in that in a method of detecting the contemporary geodynamic movements in a massif, which consists in exciting an electromagnetic field in the medium adjoining the massif surface with the help of an electromagnetic radiation source; periodically measuring, within a circle having a radius of up to 5 meters from a center located at a profile point, a series of values of one of the parameters of the electromagnetic field, which is a function of the electromagnetic parameters of said medium; comparing the results of said periodic measurements of said parameters of the electromagnetic field, characterizing the azimuthal anisotropy of the electromagnetic properties of said medium, and evaluating said contemporary geodynamic movements deforming said medium according to changes in said azimuthal anisotropy of the electromagnetic field parameter upon periodic measurements, the presence of said contemporary geodynamic movements, which cause deformations of the compression-tension type in the massif when the characteristic of said azimuthal anisotropy of the electromagnetic field parameter being measured is stable, is determined, and the presence of contemporary geodynamic movements causing massif deformation of the shear type is determined when the characteristic of said azimuthal anisotropy is variable.

The object of measurement according to the proposed method as described above is a physical characteristic of a medium, which characteristic is radially different from that selected for the same purpose in the prior art method which is bearing closely on the invention. This physical characteristic is an azimuth anisotropy of electromagnetic properties, which is observed in a medium irradiated by the electromagnetic field, and which medium constitutes a portion of a massif or is a material temporarily brought into contact with said massif. It has been experimentally established by the authors of the present invention (more than 300,000 measurements have been processed and examined) that this anisotropy occurs at any level being controlled, including layers close to the earth's surface (both below and above), and corresponds to the contemporary tectonic stress field and the current geodynamic movements associated therewith.

The term "geodynamic movement" refers to geodynamics or abyssal forces and processes developing in the course of the evolution in the earth as a planet resulting in changes in stress fields and changes in the physical characteristics of a massif occuring under the effect of stress fields. "Contemporary tectonic movements are preceded by processes of accumulating elastic energy and accompanying changes in physical fields of units of the earth crust. These processes, according to our understanding, are the essence of geodynamic movements." (Ryaboshtan J. S., Kazakov P. E. "On Interrelation Between Geodynamic and Contemporary Tectonic Movements of the Earth Crust in Donetsk Basin", abstracts of papers of the Seventh All-Union Conference on Contemporary Movements of the Earth Crust, Inter-Department Geophysical Committee at the Presidium of the USSR Academy of Sciences, Moscow, 1977, pp. 84–85).

Therefore, the term "geodynamic movement" implies not a movement of a geological massif under the effect of geodynamics but a geodynamic process or geodynamics itself, that is changes in a stress field and physical characteristics of a massif.

The present invention is based on the concept of detecting areas of active geodynamics in massifs through geodynamics in an information medium adjacent to the surface of the massif, which is thixotropic and highly sensitive to stress fields.

The study of geodynamics in a massif without the use of the information medium fails to provide objective information on the state of the massif because the massif contains information accumulated during prior periods of geological development in the form of numerous fractures, small faults and slacking zones, so areas of active geodynamics cannot be detected.

The present method makes it possible to detect areas of active geodynamics because in the information medium a stress field changes under the effect of contemporary geodynamics, which results in microfracturing whose density and azimuthal orientation correspond to the contemporary stress field. By irradiating the information medium with an electromagnetic field along various azimuthes, there are obtained various values of signals received with constant power and frequency of a transmitter and an unchanged relative position of the transmitter and receiver. This meaning is implied by the term "azimuthal anisotropy".

A repeated measurement in the information medium at the same point gives either the original picture of signals received along the same azimuthes or a changed picture of signals received, and indicates active or "quiet" geodynamics and the character of geodynamics—compression-tension or shear. The character of geodynamics in the massif is judged by the character of geodynamics in the information medium. If there is compression-tension in the information medium, compression-tension also occurs in the massif. If there is shear in the information medium, shear also occurs in the massif.

It should be particularly emphasized that the azimuth anisotropy of electromagnetic properties of rocks and pavements, established by us is of a geodynamic nature and is not identical with the anisotropy caused by the natural inhomogeneity of rock medium.

The latter is determined by the prior art method utilizing a circular sounding, as described above, and the measuring procedure and equipment used for carrying out this method do not allow revealing the anisotropy of a geodynamic nature, and hence the contemporary geodynamic movements, since at the distances used in the prior art method this information is suppressed by the information about the natural inhomegeneity of the medium.

When the measurements are made according to the proposed method at the points located in a circle of up to 5 m radius the information about the anisotropy caused by the current tectonic stress fields is prevailing. This is explained by that within such small areas and depths the medium being examined is in most cases not magnetic, has a natural homogeneity and isotropy of electromagnetic properties, and a high rate of relaxation (lasts hours), which predetermines the possibility of controlling dynamics of changes in its physical, and in particular, electromagnetic properties caused by variations of the current tectonic stress field.

Since the field set up in the medium being examined is artificially established there is provided thereby a possibility to control the depth of survey by adjusting operational parameters of the equipment used for carrying out the method. This makes it possible to limit the depth of survey by values at which the medium being examined is homogeneous and isotropic by its nature, and to thereby improve the accuracy of data obtained by measurements taken in accordance with the proposed method.

Furthermore, as there is no need to physically penetrate into the medium being examined the cost of operations required for detecting the contemporary geodynamic movements may be considerably reduced as a result of a direct reduction of working hours required for carrying out the proposed method (1 man is required for carrying out the proposed method instead of 2 to 3 men required to realize the prior art method) and also at the expense of excluding a possible damage which may be caused by earth work required by the prior art method.

The nature of the physical characteristic selected as an object of measurements according to the proposed method allows the use of methods of non-parametric analysis, which practically eliminates destabilized factors in evaluating the results of measurements, and thus substantially improves the accuracy of conclusions.

Using the azimuth anisotropy of the electromagnetic properties of the medium being examined as an object of measurements and a measuring procedure determined thereby, for measuring of electromagnetic parameters in different directions makes it possible to evaluate the current geodynamic movements in terms of vector quantities, and to determine the nature of rock deformation caused by said movements. Such a qualitative evaluation of rock deformation is one of the advantages the proposed method has over the prior art method, and which, as disclosed below, further improves its ability in providing information.

For quantitative evaluation of rock deformation caused by the contemporary geodynamic movements the medium being irradiated has to be caused to pass into a quasi-isotropic state before each consecutive measurement, if the values of the electromagnetic parameter being analyzed, obtained from the previous measurements are substantially different.

Causing the medium to pass into a quasi-isotropic state before its being measured provides in all cases the possibility to measure a speed of development in the irradiated medium of an azimuth anisotropy of the parameter being controlled, and to thereby determine the intensity of the contemporary geodynamic movements which are the function of said speed.

For quantitative evaluation of rock deformation in the form of displacement it is expedient to select in each quadrant of a circle formed by the points at which there are periodically measured series of function values of the electromagnetic parameter of the medium being irradiated, a function value which is maximum for a given series of the function values, to compare azimuth position of the points corresponding in the same quadrant to the selected maximum values obtained by measuring in different times, and from the ratio of the azimuth difference between the points being compared to a time interval between two measurements being compared to determine the intensity of movements which have caused said rock deformation.

For quantitative evaluation of rock deformation of a compression-tension type it is expedient to select in each quadrant of a circle formed by the points at which there are periodically measured series of values of the electromagnetic parameter of the medium being irradiated, maximum and minimum function values in a given series of these parameter values, to compare ratios of these values measured at different times, and determine the intensity of the contemporary geodynamic movements causing said rock deformation from the rate of variation of said ratios.

Such measurement procedure permits ruling out accidental factors affecting evaluation of the measurement results.

As a medium to be irradiated use may be made of a surface layer of a massif. The advantage of such a medium consists in that it is capable of providing necessary information and is easily accessible. Unlike the prior art method which is bearing closely on the proposed method the latter place less stringent requirements on the degree of homogeneity and isotropy, which said layer must have because of using non-parametric analysis of the measurement results, which the proposed method involves as follows from the above description. For the same reason the proposed method may be applied without taking into concideration a baro-hydro-thermal factor. Nevertheless, the use of the surface layer of said massif as a medium to be irradiated is advisable and possible only in the cases when this layer is, by its nature, homogeneous, isotropic and feature a short memory, that is has a short time of relaxation (in the range of 20-30 hours, and it is desirable to have this time even shorter) with respect to a physical characteristic being examined. In particular, such properties are characteristic of clay, loam, black soil (chernozem), the ice of frozen water basin, some pavements, such as asphalt, for instance.

If a surface layer of a massif is rock, loose or water media, it cannot provide much information when surveyed by the proposed method. In this case it is expedient to use a control medium as a medium to be irradiated, brought into contact with the surface layer of the massif, which control medium is a non-magnetic material which is homogeneous and features an isotropy of the electromagnetic parameter being examined, and whose solid-liquid transition point lies in the range of the natural change of temperatures.

Such media, when in solid state, are information carriers, and their transition into a liquid state provides for a reliable erasing of previously memorized information. As such media use may be made of ice, wet loam, or asphalt. Ice is very convenient for this purpose, because it is almost always available, or may be easily obtained under certain temperature conditions, asphalt can also be easily produced from the materials which are throughout available, and wet loam is abundant in nature.

The use of the control media widens to a great extent a scope of operation and efficiency of the method, and makes it useful in all cases irrespective of the type of soils constituting the surface layer of the massif.

An anisotropy of the electromagnetic properties of the medium being irradiated can be more fully characterized by values of all the electromagnetic parameters of the medium (conductivity, dielectric constant, magnetic permeability, and magnetic loss resistance), which requires, however, a full description of the magnetic and electric components of the electromagnetic field, which description is represented in terms of six characteristics of the field (either elliptical, or orthogonal, or a combination of the former and latter).

Constructional and operational complexity of the equipment to provide recording of the six characteristics of the field and its low speed of operation are responsible for that in practice not full but only a partial description of the field is used.

An optimum compromise between the requirement of economical efficiency of the proposed method and the accuracy of the results to be obtained may be such an embodiment of the invention, wherein in the course of periodical measurements there are recorded a series of amplitudes of the magnetic component of the electromagnetic field, representing the values of functions of a complex admittance of the medium being irradiated.

Measurement equipment used in such embodiment of the proposed method is simple in construction and does not require special training of attending personnel.

At the same time, as experiments have shown, the function to be analyzed contains a great quantity of information with respect to anisotropy of electromagnetic properties of the medium being irradiated, and provides obtaining sufficiently accurate data necessary for structural-geodynamic mapping.

BRIEF DESCRIPTION OF THE DRAWINGS

The invention will now be explained with reference to embodiments thereof which are represented in the accompanying drawings, wherein.

DETAILED DESCRIPTION OF THE INVENTION

Figure 1:
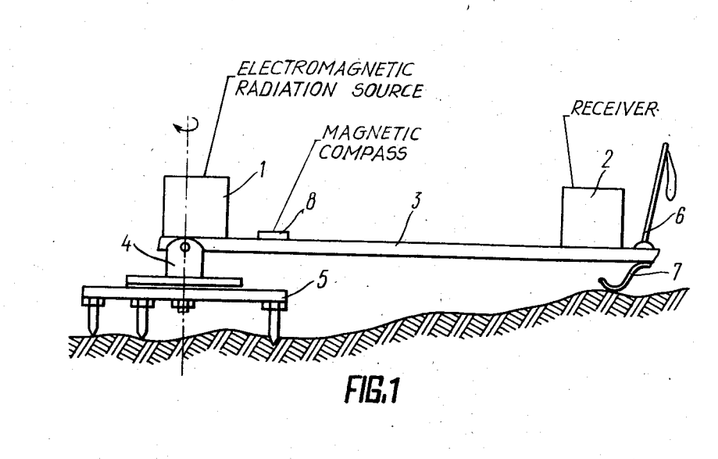
FIG. 1 schematically represents an induction apparatus for carrying out the method of the invention.

For detecting the contemporary geodynamic movements in a massif by the method of the invention an electromagnetic field is set up in the overlying medium adjacent the surface of the massif, which field is set up with the aid of an induction apparatus schematically represented in FIG. 1.

The induction apparatus comprises an electromagnetic radiation source 1 which may be any known in the art harmonic oscillation generator, and a receiver 2 disposed at the ends of a dielectric bar 3. One end of the bar 3 is pivoted to a rotatable table 4 mounted for rotation about the vertical axle of a support plate 5. At the free end of the bar 3 there is provided a handle 6 for rotation, and a damping support 7. The bar 3 is made extensible (not shown in the drawings) and adjustable in length. For initial orientation there is provided a magnetic compass 8 mounted on the bar 3.

In the case of the presence in the massif surface layer of a medium featuring a short time of relaxation (measuring hours) the electromagnetic field is set up directly in this layer at a depth not exceeding the natural depth of its occurence. To such media belong some overlying soils (clay, loam, chernozem, i.e. black soil), ice of the frozen water basins, some pavements (asphalt, concrete, bitumen). The depth of survey is normally from several decimeters to 1 meter, and as a maximum may be up to 2.5 m. In each particular case this depth is selected taking into account real conditions and is adjusted by the conventional method, that is by varying the generator frequency, or when the said frequency is constant by measuring a distance between the source 1 of the electromagnetic radiation and the receiver 2.

If the surface layer of the massif by its properties is not convenient or is unsuitable for measuring the characteristics of the electromagnetic field which may be a case if said layer consists of rock, the time of relaxation of which lasts many years, or non-competent ground, like, for instance, loose soil, a layer of a control medium is arranged on the station so as to be in contact with the massif surface, whereafter an electromagnetic field is established in said control medium to a depth equal to the layer of the control medium. The material of a control medium is selected from among non-magnetic, isotropic, homogeneous materials having their solid-liquid transition point in the range of the natural change of temperatures. In this case, the preferred materials are those materials which are available or readily transported. To such materials belong, in particular, wet loam, ice, and asphalt. There may be also used concrete, bitumen and the like.

The induction apparatus is installed on the profile of the site being surveyed so that a geometric axis of rotation of the rotatable table coincides with the station peg. In this case the source of electromagnetic radiation is also located on the same axis, or, in the case of using a self-recording device, located on the axis is the receiver 2, whereas the source 1 of electromagnetic radiation is disposed on the opposite end of the bar 3. With the aid of the magnetic compass 8 the bar 3 is set in its initial position with its free end showing or pointing to the NORTH. The length of the bar 3 is adjusted proceeding from the specific conditions. The maximum length to which the bar 3 can be adjusted is such that the base length of the apparatus (i.e. a distance between the source 1 of electromagnetic radiation and the receiver 2) is equal to 5 meters. The use of the apparatus having the base in excess of 5 m is not expedient, because the depth of survey which increases with the base of a survey apparatus (if not limited by the skin layer) may reach such value (after recommended limit is exceeded) at which the results of survey may be distorted by the influence of the natural inhomogeneity of the medium being examined. In addition, the speed of operation sharply decreases, and in the case of using a control medium the consumption of material, and working hours required for its transportation to and handling on the station site increases.

In principle, said base is usually selected as minimum as possible. However it should be taken into consideration for certain media the minimum survey depth must be greater than the depth of the surface layer which, as a result of erosion and/or cultivation may be rendered unsuitable to serve as a carrier of geodynamic information.

After the parts of the bar 3 are adjusted to a required length they are rigidly fixed, and with the aid of the hand 6 the bar 3 is rotated to thereby circularly move the receiver 2 (or the source of electromagnetic radiation), with the rotation being periodically stopped (in the case of a self-recording device said rotation is effected without interruption). Angle of rotation on which is indicated by a limb secured on the base plate 5 of the apparatus is selected depending on a required degree of accuracy and is, as a rule, from 5° to 30°. At the points located in a circle and corresponding to said stops there is measured an amplitude of the magnetic component of the electromagnetic field with the use of the recording device of the receiver 2.

Figure 2A:
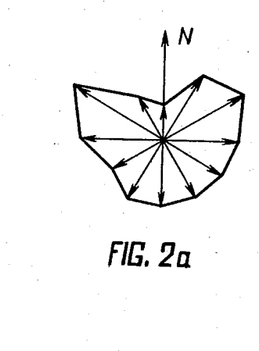
FIGS. 2a-c illustrate polar diagrams of the results obtained by three measurements of series of amplitudes of the magnetic component of the established electromagnetic field, with said measurements being effected at different times on one and the same station in accordance with the method of the invention.
Figure 2B:
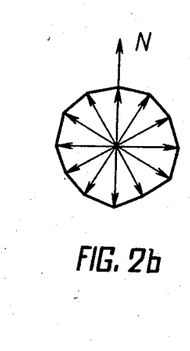
Figure 2C:
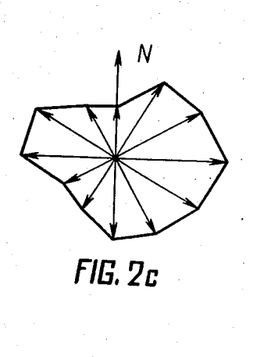

The results of simultaneously measuring a series of amplitudes at each station of the profile are recorded in the form of a table or a polar diagram. Each amplitude obtained is presented on such a diagram (see FIG. 2) in the form of a vector drawn from the centre of coordinates to the periphery at an angle to the axis of ordinates, equal to the azimuth of the corresponding point of measurement. A broken line connecting the ends of all the vectors of such a diagram, approximately corresponds to a qualitative characteristic of the azimuth anisotropy of the medium electromagnetic properties. Actually the diagram represents the anisotropy of a complex admittance of said medium, whose function is an amplitude of the magnetic component of the electromagnetic field. The experiments show that the complex admittance as a parameter of electromagnetic properties of the medium may provide the greatest amount of information, and the amplitude of the magnetic component of the electromagnetic field is a most convenient characteristic for measurements without using costly equipment. It is to be noted however, that there is no ground for doubts that in principle the anisotropy of electromagnetic properties can be determined through the other characteristics of the field. In particular, not less information can be obtained by measuring amplitudes of electric components of the electromagnetic field. A lack of sufficiently efficient measuring equipment is responsible for that such possibility is not used in practice so far.

The above measurements are repeated after a predetermined period of time. The number of repeatedly made measurements and their evaluation depends on the purpose of survey. If the purpose of the survey is reduced to a differentiation of the contemporary geodynamic movements by type of the rock deformation caused thereby, it is quite sufficient to make two measurements at an interval which deliberately should be longer than the time of relaxation of the medium being examined, and then compare the thus obtained qualitative characteristics represented by the series of the amplitudes of the magnetic component of the electromagnetic field (which amplitudes are recorded either in the form of tables or polar diagrams). If the characteristic expressed is constant, in particular graphically, by geometrical similarity (that is a similarity of geometrical figures) obtained as a result of measurements made at different times on the same stations (see FIGS. 2a and c) the presence of the contemporary geodynamic movement is determined which corresponds to a rock deformation of a compression-tension type, and if the qualitative characteristic varies, which is expressed in disturbance of geometrical similarity (see FIGS. 3a and b), the presence of the current geodynamic movement is determined which corresponds to the rock displacement.

Judgment on whether the qualitative characteristics are constant or vary may be made on the basis of computing the measurement results by the methods of a phase pair correlation.

Through a great many experiments it has been established that the greatest nonuniformity of movements by type of rock deformation is related to tectonic disturbances, the zones influenced thereby, zones of formation of cock-pits, landslip, and to the zones of technogenic movements. Therefore, differentiation of movements by type of rock deformation provides for effective mapping of the tectonic disturbances, cock-pits, landslip and zones of technogenic movements.

On the basis of twofold measurements, made as described above, it is possible to approximately determine a relative intensity of the contemporary geodynamic movements associated with a rock displacement (from the angle of rotation of the vector of the maximum amplitude for the period of time equal to an interval between two measurements).

Figure 4:
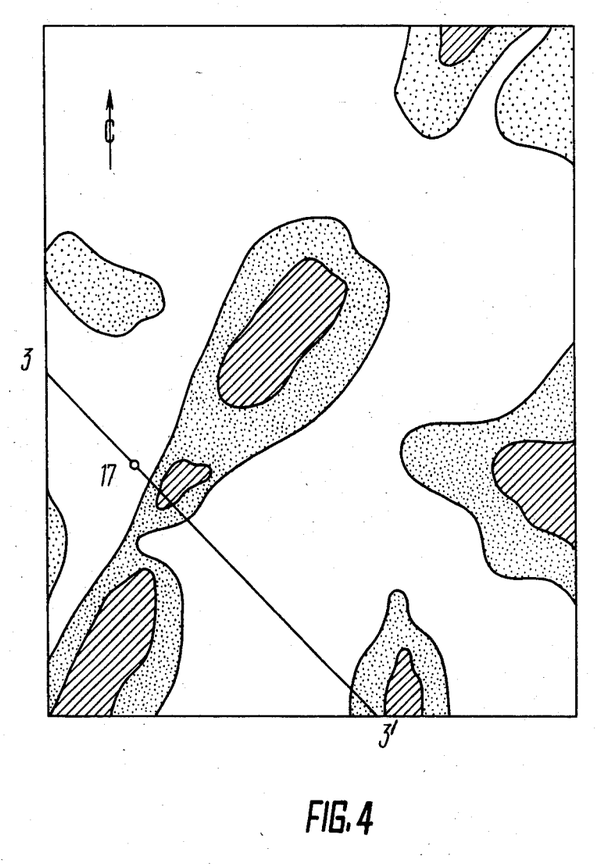
FIG. 4 illustrates a structural-geodynamic terrain map showing boundaries of zones of the different contemporary geodynamic movements, which map was made on the basis of measurements made in accordance with the method of the invention.

Shown in FIG. 4 is a map of a region, drawn up on the basis of two-fold measurements effected according to the above procedure. The portions which are not cross-hatched correspond to the contemporary geodynamic movements associated with the rock deformation of a compression-tension type, and the cross-hatched portions show the regions of most intensive rock displacement.

Making such maps may be a final object of a survey, but in some cases such maps may serve only as a preliminary stage of a work whose final object is to determine the intensity of the contemporary geodynamic movements. Having such a map at hand a researcher can concentrate his further work on those sites of the area being surveyed, which can provide more information, which in turn improves economy and efficiency of a surveying work.

If there is a need to evaluate the intensity of geodynamic movements the measurements are made many times, in which case the medium being irradiated is caused to pass into a quasi-isotropic state before each next measurement in the course of a series of periodical measurements if the results of the previous measurement is substantially different, that is differ from one another by more than a predetermined percentage selected depending on the physical properties of a particular medium (in average about 10%). This provides for erasing memorized information and obtaining a reference value for evaluation of variation of the anisotropy of the complex admittance, from which variation one may have an idea about the intensity of the contemporary geodynamic processes.

Causing the surface layer or a control medium to pass into a quasi-isotropic state is done depending on the properties of the medium either by loosening or momentarily acting thereon by heat.

For quantitative evaluation of the contemporary geodynamic movements which cause rock displacement in each quadrant of the polar diagram corresponding to the quadrant of a circle formed by the points of measurements there is selected a maximum amplitude, and the angles of the selected vectors (differing by time of measuring) relative the axis of ordinates. These angles correspond to azimuth positions of the points of measurements.

The ratio of the difference of the angles being compared to the interval between the measurements being compared constitutes a speed of rotation of the selected vectors, which is indicative of the intensity of the contemporary geodynamic movements corresponding to a rock displacement.

Quantitative evaluation of the current geodynamic movements associated with rock displacement is effected by that in each quadrant of a polar diagram where there are selected a maximum and a minimum amplitude and the ratio of the values thereof are compared, which values are obtained at different times. The intensity of such a kind of the contemporary geodynamic movements are evaluated from the speed of variation of said ratios, calculated as a quotient of said ratios (for comparing measurements made at different times) referred to the time interval between these measurements.

A qualitative evaluation of the contemporary geodynamic movements is of special importance at a stage of designing engineering structures, and is closely associated with forecasting seismic phenomena, rock bumps, and outbursts in mines.

A fuller understanding of the nature of the invention will be clear from the following description of specific embodiments thereof.

EXAMPLE 1

A survey was carried out in the area of a deep-seated tectonic structure discovered by drilling under a cover of sedimentary rock, with the depth of cover being 500 meters. Of 500 meters of the depth of cover 70 meters in depth was loose rock. The area in which surveying operation was conducted was covered by a water basin 6-8 meters deep. The survey was carried out in winter on the ice 200-300 mm thick.

On the stations of a network of geophysical profiles with a spacing of 10 meters there was examined an electromagnetic field set up in the ice and surface layer of water with the use of a generator of harmonic oscillations incorporated in the induction apparatus having a short base (as described above and shown in FIG. 1). The distance between the generator and the receiver was 5 meters, and the operating frequency of the generator was 2 MHz which ensured a 2 m depth of an electromagnetic sounding. The receiver sensitivity was 0.5 mV/m.

With the aid of the receiver which was moved in a circle relative the generator located at the profile point with an angle of rotation of 30° there was recorded the amplitude of the magnetic component of said electromagnetic field. The operation was carried out by one operator at 100 stations during a day-time.

The repeated survey of the area was conducted one day later, which exceeded in time the relaxation time of the medium being examined.

The results of measurements (see FIG. 5) for three stations of the same profile denoted by numerals 73, 76, 79 are given in Table 1, wherein Roman numerals I and II denote data obtained by the first and second surveys respectively.

TABLE 1

| Azimuth | Survey | | | | | |
|---|---|---|---|---|---|---|
| | I | | | II | | |
| | Stations | | | | | |
| | 73 | 76 | 79 | 73 | 76 | 79 |
| 0 | 17 | 38 | 21 | 14 | 20 | 18 |
| 30 | 40 | 29 | 27 | 33 | 13 | 24 |
| 60 | 20 | 17 | 50 | 17 | 11 | 47 |
| 90 | 23 | 14 | 18 | 18 | 10 | 16 |
| 120 | 31 | 10 | 12 | 30 | 12 | 14 |
| 150 | 27 | 12 | 30 | 22 | 38 | 27 |
| 180 | 35 | 40 | 42 | 33 | 42 | 39 |
| 210 | 25 | 45 | 23 | 31 | 34 | 12 |
| 240 | 32 | 30 | 11 | 27 | 14 | 18 |
| 270 | 16 | 15 | 17 | 14 | 12 | 16 |
| 300 | 42 | 14 | 30 | 37 | 11 | 20 |
| 330 | 30 | 30 | 20 | 29 | 28 | 18 |
| 360 | 16 | 36 | 21 | 14 | 21 | 17 |

In Table 2 given below the same results are represented in the form which is convenient for the purpose of comparison, including a rank correlation element.

TABLE 2

| | Stations | | | | | |
|---|---|---|---|---|---|---|
| | 73 | | 76 | | 79 | |
| Rank | I | II | I | II | I | II |
| 1 | 300 | 300 | 210 | 180 | 60 | 60 |
| 2 | 30 | 30 | 180 | 150 | 180 | 180 |
| 3 | 180 | 180 | 0 | 210 | 150 | 150 |
| 4 | 240 | 210 | 240 | 330 | 300 | 30 |
| 5 | 120 | 120 | 330 | 0 | 30 | 300 |
| 6 | 330 | 330 | 30 | 240 | 210 | 0 |
| 7 | 150 | 240 | 60 | 30 | 0 | 240 |
| 8 | 210 | 140 | 270 | 120 | 330 | 330 |
| 9 | 90 | 90 | 150 | 270 | 90 | 90 |
| 10 | 60 | 60 | 90 | 60 | 270 | 270 |
| 11 | 0 | 0 | 300 | 300 | 120 | 120 |
| 12 | 270 | 270 | 120 | 90 | 240 | 210 |

When analyzing and comparing characteristics of azimuth anisotropy of the complex admittance of the medium being explored obtained as a result of measurements taken at different times and represented by a series of the magnetic component amplitudes of the electromagnetic field of each station, the zones of the area being surveyed in which there were observed a clear-cut indication of rotation of the anisotropy axis, detected by the first survey, were classified as zones of the contemporary geodynamic movements associated with the rock displacement, and the rest of the zones wherein said axis rotation did not take place were classified as zones of the contemporary geodynamic movements associated with rock deformation of a compression-tension type.

As may be seen in Table 2, in particular, the destabilization of the azimuth anisotropy for the second survey is most pronounced at the station No. 76.

Figure 5:
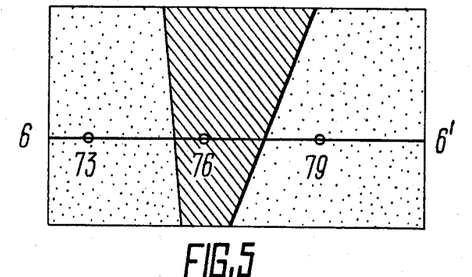
FIG. 5 shows a fragment of the map in FIG. 4.

Shown in FIG. 5 is a fragment of a map of the surveyed area, made on the basis of the measurements described above. Shown on this fragment are stations Nos 73, 76 and 79 and also boundaries between the zone wherein the contemporary geodynamic movements correspond to rock displacement (crosshatched) and the zone where a rock deformation is of a compression-tension type. Drawn up in solid line is the axis of a tectonic structure discovered by drilling. It may be inferred from what is shown on this fragment that the most pronounced inhomogeneity of movements differring by nature of the rock deformation associated therewith is observed in the zone of tectonic structure. thus, the differentiation of the contemporary geodynamic movements by the type of rock deformation makes it possible to judge the position of said tectonic structure.

EXAMPLE 2

A survey was carried out in the area timed to a throwoff of an of the north-east strike, the location of which was defined more exactly by mining operations. The depth of loose deposits measured tens of meters. The surface portion of said deposits consists of sand loam with rare inclusions of shingle and boulders. The survey was conducted on the stations of a network of geophysical profiles with spacings of 5 meters by means of the same induction apparatus as in Example 1. The base of the apparatus in the course of surveying all the profiles except for one (3-3[1]) was 2 meters, and the operating frequency was 300 MHz. The depth of sounding was in the range of few decimeters which was quite enough, since the layer to provide information was an asphalt layer.

On the basis of the measurements taken at each station, with an angle of rotation being 30°, carried out in a similar manner as in Example 1, and subsequent analysis of the results obtained, a schematic map of the surveyed area was drawn up (FIG. 4). The cross-hatched areas correspond to the contemporary geodynamic movements associated with rock displacement. The slantwise hatched portions correspond to the zones where these movements are especially intensive, which may be approximately determined from an absolute value of the difference of numbers in columns I and II of the correspondng rank of the table, made in the same manner as Table 2 at that stage of survey which was the final one in Example 1.

Figure 3A:
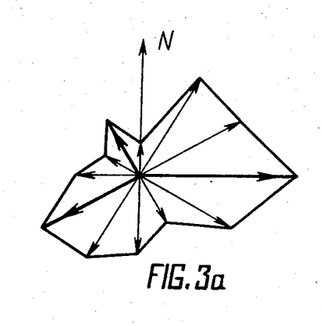
FIGS. 3a, b illustrate polar diagrams of the results obtained by two measurements of series of amplitudes of the magnetic component of the established electromagnetic field, with said measurements being effected at different times on the other station in accordance with the method of the invention.

This map was used to define more exactly boundaries of the area which was most promising from the viewpoint of carrying on the survey (this area on the map is located close to the profile denoted by numerals 3-3[1]), whereafter measurements were taken in the selected area, using the same measuring procedure as in Example 1. On the basis of the measurements relating to station No. 17 of the profile 3—3¹, there was drawn up a polar diagram shown in FIG. 3a. A broken line connecting the ends of all the vectors corresponds to a characteristic of azimuth anisotropy of the complex admittance of the asphalt pavement. In each of the four quadrants of the polar diagram there were determined the axis of anisotropy, corresponding to the directions of the amplitude vectors having a maximum absolute value (in FIG. 3a are drawn in solid lines). In this particular case these vector directions coincide with azimuths 90°, 240°, and 330° (the azimuth 90° axis was a common axis for two quadrants).

After the measurements have been completed the asphalt on the station No. 17 in a radius of 1 meter was heated for a short time, and control measurements taken immediately after said heating showed a difference in absolute values of the measured amplitudes in the range of 10%, which indicated that the asphalt pavement in the area of measurements was in a quasi-isotropic state.

16 hours and 45 minutes later there were conducted repeated measurements the results of which for the station No. 17 are represented on the polar diagram in FIG. 3b.

Figure 3B:
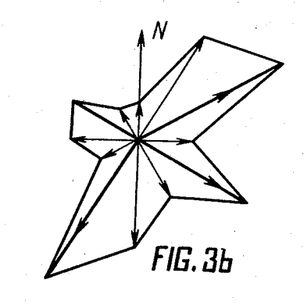

Examination of this diagram revealed 4 axes of anisotropy, corresponding to azimuths 60°, 120°, 210°, and 300° (are shown in solid lines), Comparison examination of the polar diagrams in FIGS. 3a and 3b made it possible to conclude that the three of four axes of anistropy are axes revealed by the previous measurements, said axes rotated in a counter-clockwise direction through 30°.

The intensity of the rock displacement was determined by the speed of rotation of the axes of anisotropy, obtained by dividing said angle value of the anisotropy axes by the time interval between two said measurements. For this station this speed was 1.85 degrees per hour, which pointed to the fact that the intensity of the contemporary geodynamic movements was insignificant, in which case these movements are considered to correspond to the rock displacement (for surveys conducted with the use of the proposed method there are known cases when the speed of rotation of the axes of anisotropy was 10 degrees per hour).

Figure 6:
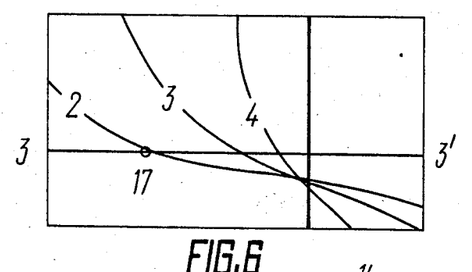
FIG. 6 is a fragment of a contemporary geodynamic movement intensity map drawn up in isoclinic lines on the basis of measurements made in accordance with the method of the invention.

On the basis of the measurements made on the station of the whole area being surveyed was made an intensity map (in isoclinic lines) of the contemporary geodynamic movement corresponding to the rock displacement. A fragment of this map with the profile 3—3¹ and the station 17 thereon is shown in FIG. 6. Numerals on the isoclinic lines correspond to the speed of rotation of the axes of anisotropy in deg per hr. Shown in solid line is an axis of the tectonic structure discovered by mining operation. As shown on this fragment the highest intensity of the contemporary geodynamic movements is observed in the zone of tectonic structure the position of which may be determined with a high degree of accuracy by applying the proposed method.

EXAMPLE 3

A survey site was located in a zone of throw-off. The depth of loose deposit exceeded 10 meters. The surface layer comprises loessial loams. The survey was carried out with the use of a geophysical profile network on the stations with 10 m spacing, and using the same induction apparatus, as in Example 1.

The base of the apparatus was 1.6 m, and the operating frequency was 100 KHz. These operating parameters of the apparatus ensured efficient sounding of the surface layer to a depth of 0.4.

After two measurements made in accordance with the measuring procedure described in Example 1, a schematic map was drawn up similar to that shown in FIG. 4. Then with the help of this map there was selected a zone wherein prevailing geodynamic movements where those which were associated with a rock deformation of a compression-tension type. An open test pit of 2.0 m radius and 0.6 m deep was prepared on each station within the limits of said zone. After loosening, the soil was placed again into said pit in the same order of layers and then carefully compacted. The measurements taken immediately after said recultivation, that is refilling the pit, showed that maximum difference between the amplitude values was 6%, which was lower than maximum allowable 10% adopted for a quasi-isotropic state of wet loam, taking into account measurement errors and the medium properties. Shown in FIG. 2b is a polar diagram of the measurement results obtained on the station No. 6 of the profile 14—14¹.

17.5 hours later repeated measurements were taken, the results of which measurements for the same station are given on the polar diagram in FIG. 2c.

Thereafter, a maximum and a minimum amplitude $H_{max}$ and $H_{min}$ were selected in each quadrant of the polar diagram, and the ratios ($H_{max}/H_{min}$) obtained as result of measurements taken at different times were compared. The intensity of the contemporary geodynamic movements was determined from the speed of variation of said ratio. The results of said two measurements and of the described analysis for the fourth quadrant of the polar diagram of the station 6 on the profile 14—14¹, which is more spectacular, are tabulated in Table 3.

TABLE 3

| Measurement No | $H_{max}$ | $H_{min}$ | $\frac{H}{H}$ | Time interval between measurements (in hr) | The intensity of geodynamic movements |
|---|---|---|---|---|---|
| 1 | 18 | 17 | = 1.06 | 17.5 | $\frac{1.81}{17.5} = 0.1$ |
| 2 | 26 | 14.33 | = 1.81 | | |

A thus obtained value 0.1 indicates that the intensity of movements is insignificant.

Figure 7:
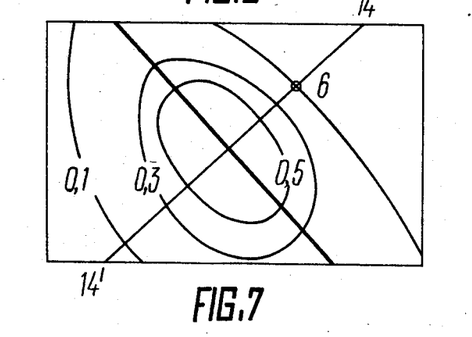
FIG. 7 is a fragment of a current geodynamic movement intensity map made in isolines on the basis of measurements effected in accordance with the method of the invention.

From the data thus obtained and the analysis of the measurement results, made on all the stations of the zone being surveyed a map of intensity of the contemporary geodynamic movements corresponding to the rock deformation of a compression-tension type was drawn up in isolines, a fragment of which map with station No. 6 of profile 14—14¹ is shown in FIG. 7. The numerals on the isolines express the intensity values obtained as described above. The axis of tectonic structure revealed by mining operations is shown in a solid line. Like in Example 2 the zone of influence of the tectonic structure manifested itself as a zone of the highest intensity of the contemporary geodynamic movements.

Figure 8A:
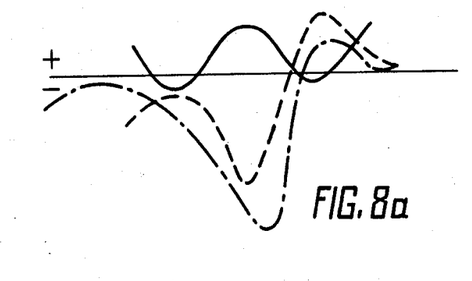
FIGS. 8a–c illustrate diagrams of variation of the field of the contemporary geodynamic activity, drawn up for three areas of active landslide on the basis of measurements made by a conventional method utilizing instrumental measuring, the prior art method utilizing the emanation ability of soils, and the method of the invention respectively.
Figure 8B:
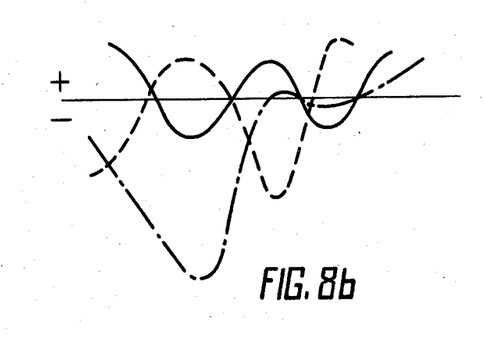
Figure 8C:
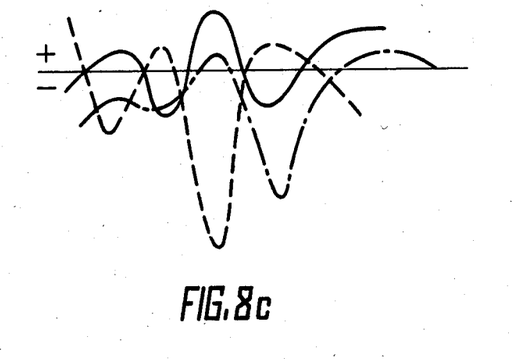

Accuracy of conclusions made with the use of the method of the invention is proved, in particular, by comparing the results of surveys of one and the same tectonic fault, conducted by applying three different methods, as shown in FIGS. 8a-c, wherein for the three regions of active landslip the diagrams are made showing variations of the geodynamic fields, obtained from the results of the direct instrumental measurements (shown in a dash-dot line), data of measurement of the soil air emanations (shown in a dot line), and measurements of anisotropy of the medium complex admittance (shown in a solid line). The diagrams were made on the basis of results obtained by processing said measurements by a data processing machine by applying a pair-correlation method. Comparison examination shows a full synchronism in time in variations of geodynamic fields and their increments with a progress of the rock deformation.

The proposed method of detecting the contemporary geodynamic movements is efficient, provides a great amount of information, has a wide range of application, and is simple to carry out. In comparison with the prior art method based on evaluation of the emanation ability of soils the proposed method provides for a more contrast indication of the intensity of the contemporary geodynamic movements in the azimuth complex admittance of media, possesses a wider survey range of geodynamic processes, provides for a more well-defined interpretation. In addition, the surveys are conducted in easy-to-reach and widely spread media, including such media which cannot provide information when surveyed by said prior art method, namely, frozen and rocky soils, ice of frozen water basins, asphalt and concrete pavements and the like. Nonparametric procedure of processing measurement results, utilized by the proposed method rules out destabilizing factors.

The proposed method is applicable for examining rock deformation both in laboratories and in the field. Furthermore, the method may be used for forecasting outbursts, cavings, and the like in mines and open casts, as well as seismic phenomenon.

On the basis of data obtained by the proposed method it is possible to draw up detailed structural-dynamic maps with a scale of up to 1:500, which improves tie-in and designing of engineering structures.

What we claim is:

1. A method of detecting contemporary geodynamics in a massif, comprising the steps of:
    marking profiles on a surveyed site of the surface of each massif;
    setting up stations on said profiles at a distance of about 5 meters to about 10 meters from each other, each of said stations being a center of a circle with a radius of up to 5 meters;
    covering the surface of each of said circles with an information-carrying medium which is highly sensitive to stress fields, said medium comprising isotropic homogenous, non-magnetic materials having their solid-liquid temperatures in the range of the natural change of temperatures;
    for each of said circles, installing an electromagnetic field source substantially at the center of said circle;
    installing an electromagnetic field receiver at the periphery of said circle, said electromagnetic field source and electromagnetic field receiver being arranged along a preset azimuth;
    carrying out with said electromagnetic field receiver a set of original measurements at said periphery along various azimuthes of one of the parameters of the electromagnetic field of the information medium;
    thereafter, exposing said information medium limited to the area of said circle at least once more to said electromagnetic field;
    carrying out repeated measurements along the same azimuthes of the same one of said electromagnetic field parameters of the information medium after a predetermined period of time; and
    comparing the results of said set of the original measurements of one of the parameters of said electromagnetic field of said information medium with the results of the repeated measurements of the same parameter of the electromagnetic field of the information medium;
    whereby if there are no differences in the results of said set of the original measurements of one of the parameters of said electromagnetic field of the information medium and the repeated measurements of the same parameter of said electromagnetic field of the information medium, the geodynamics of the information medium, and consequently of the massif, is said to be stable, while if the extreme values of said electromagnetic field parameter of the information medium vary, with the receiver-transmitter azimuth being unchanged, the geodynamics of the information medium, and consequently of the massif, is considered active and characterized by compression-tension; while if new extreme values of said electromagnetic field parameter of the information medium appear, with the receiver-transmitter azimuth being changed, the geodynamics of the information medium, and consequently of the massif, is considered active and characterized by shear.

2. A method according to claim 1, wherein before said repeated measurements along the same azimuthes of the same parameter of said electromagnetic field of said information medium the latter is brought into a quasi-isotropic state.

3. A method according to claim 1, wherein one of the parameters of said electromagnetic field of the information medium being measured along the same azimuthes is the amplitude of the magnetic component of said electromagnetic field.

4. A method according to claim 2, wherein one of the parameters of said electromagnetic field of the information medium being measured along the same azimuthes is the amplitude of the magnetic component of said electromagnetic field.

5. A method according to claim 1, wherein said information medium is a surface layer of said massif.

6. A method according to claim 1, wherein said information medium is a non-magnetic material including homogeneity and isotropy among its electromagnetic characteristics and having a solid-liquid transition point within the range of the natural change of temperatures.

7. A method according, to claim 6, wherein the non-magnetic material is ice.

8. A method according to claim 6, wherein the non-magnetic material is asphalt.

9. A method according to claim 1 wherein said information medium is wet loam.

10. A method according to claim 1, wherein said information medium is concrete.

* * * * *